United States Patent
Dudar et al.

(10) Patent No.: US 9,528,473 B2
(45) Date of Patent: Dec. 27, 2016

(54) METHOD AND SYSTEM FOR DIAGNOSING A PURGE EJECTOR

(71) Applicant: Ford Global Technologies, LLC, Dearborn, MI (US)

(72) Inventors: Aed M. Dudar, Canton, MI (US); Scott A. Bohr, Novi, MI (US); Matthew Werner, Marysville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 14/718,972

(22) Filed: May 21, 2015

(65) Prior Publication Data
US 2016/0341155 A1 Nov. 24, 2016

(51) Int. Cl.
F02M 25/08 (2006.01)
F02D 41/00 (2006.01)

(52) U.S. Cl.
CPC ...... *F02M 25/0836* (2013.01); *F02D 41/0007* (2013.01); *F02M 25/0854* (2013.01)

(58) Field of Classification Search
CPC .......... F02M 25/089; F02M 25/0809; F02M 25/0836; F02M 25/0854; F02M 33/025; F02D 41/0007
USPC .............. 123/516–520; 701/103; 73/114.35, 73/114.42
See application file for complete search history.

(56) References Cited

U.S. PATENT DOCUMENTS

| | | | | |
|---|---|---|---|---|
| 5,005,550 A | * | 4/1991 | Bugin, Jr. | ............ F02M 25/089 123/520 |
| 6,330,879 B1 | * | 12/2001 | Kitamura | .............. F02D 41/004 123/520 |
| 7,810,475 B2 | | 10/2010 | Peters et al. | |
| 8,312,765 B2 | * | 11/2012 | Pursifull | ............ F02M 25/0836 73/114.39 |
| 2010/0326089 A1 | * | 12/2010 | Weber | ................... F01D 17/145 60/783 |
| 2012/0089314 A1 | * | 4/2012 | Nistler | .................... F02D 28/00 701/102 |
| 2013/0220282 A1 | * | 8/2013 | Hadre | ................ F02M 25/0809 123/520 |
| 2014/0196694 A1 | | 7/2014 | Euliss et al. | |
| 2014/0251284 A1 | | 9/2014 | Plymale et al. | |

* cited by examiner

*Primary Examiner* — John Kwon
*Assistant Examiner* — Johnny H Hoang
(74) *Attorney, Agent, or Firm* — James Dottavio; Alleman Hall McCoy Russell & Tuttle LLP (57) ABSTRACT

Methods and systems are provided for diagnosing a purge path ejector used for purging fuel vapors from a canister under boosted engine conditions. The response of an exhaust gas sensor is monitored during each of vacuum purging of the canister and a subsequent boost purging of the canister, and compared to stoichiometry, to diagnose the ejector. By relying on changes in the exhaust air-fuel ratio incurred during purging, the coupling of the ejector to the compressor inlet may be diagnosed without the need for additional sensors or hardware.

20 Claims, 5 Drawing Sheets

METHOD AND SYSTEM FOR DIAGNOSING A PURGE EJECTOR

FIELD

The present description relates generally to methods and systems for diagnosing an ejector used for purging a fuel system canister.

BACKGROUND/SUMMARY

An ejector or venturi may be used as a vacuum source in dual path purging systems in an engine for fuel vapor recovery. For example, an inlet of an ejector may be coupled to an engine intake upstream of a compressor via a hose or duct and an outlet of the ejector may be coupled to an intake of the engine downstream of the compressor via a hose or other conduit. Motive fluid through the ejector provides a vacuum at an ejector suction inlet which may be coupled to a fuel vapor canister to assist in purging the fuel vapor canister during boosted operation.

If the ejector develops a leak, or if any of the hoses coupling the ejector to the compressor inlet or outlet becomes disconnected or degraded, exhaust hydrocarbons may escape to the atmosphere, rendering the vehicle emissions non-compliant. To address this issue, the integrity of the purge ejector is intermittently diagnosed. One example approach for diagnosing the ejector is shown by Plymale et al. in US 2014/0251284. Therein, leaks due to stresses to the ejector and/or degradation in ejector system components, such as hoses or ducting, are diagnosed upstream of an inlet to the ejector based on insufficient boost pressure and/or insufficient ejector vacuum generation. To reduce leaks due to hose disconnection downstream of the ejector outlet (that is, between the ejector and the air induction system (AIS)), a shut-off valve is directly mounted (e.g., via spin welding) to the AIS and coupled to the ejector outlet.

However the inventors herein have identified potential issues with such approaches. As one example, in spite of the direct mounting, the ejector may still break at the AIS or assembly plant. Alternatively, a service technician may remove it during servicing and forget to reinstall it. In any of these situations, hydrocarbons may be released into the atmosphere, undetected, during boosted purge by the ejector of Playmale. Further, if the ejector fails, in addition to the ejector, the entire AIS will need to be replaced since the ejector is directly mounted on the AIS. As such, this may add to warranty costs. The inventors have also recognized that only the upstream portion of the boosted purge line is diagnosed, and that the downstream portion of the boosted purge line remains undiagnosed. In other words, the above-discussed approach may not be able to detect a fault if the line between the ejector and the compressor inlet is disconnected or leaking.

To address at least some of the above issues, a method for diagnosing a purge ejector is provided. The method includes, indicating disconnection of an ejector coupled in a boosted purge path between a fuel vapor canister and a compressor inlet based on exhaust air-fuel ratio during boosted purge relative to exhaust air-fuel ratio during vacuum purge of the canister. In this way, a purge ejector may be diagnosed without relying on additional sensors or hardware.

As an example, in response to purging conditions being met, such as upon confirming that a fuel system fuel vapor canister is sufficiently loaded with hydrocarbons (e.g., after a refueling event), the canister may be purged under engine vacuum. A controller may monitor for a rich exhaust air-fuel ratio response at an exhaust gas sensor (e.g., a UEGO sensor) during the purge with natural aspiration. Purge is then suspended and the canister load is updated. Next, during boosted engine operation, the canister is purged under boost. If the exhaust gas sensor continues to show a rich exhaust air-fuel ratio response (that is, richer than stoichiometry) during the boosted purge, it may be determined that the ejector is not degraded. However, if the exhaust gas sensor does not show a rich response during the boosted purge (e.g., the exhaust air-fuel ratio is stoichiometric or leaner than stoichiometry), it may be determined that the ejector is degraded and that hydrocarbons are not entering the intake manifold. For example, it may be determined that the ejector is broken, clogged, or disconnected.

The technical effect of comparing an exhaust gas sensor response during vacuum purge of a purge ejector to the exhaust gas sensor response during boosted purge of the purge ejector is that it may be confirmed that the ejector is still mounted to the intake manifold housing at the compressor inlet and that hydrocarbons are not escaping to the atmosphere. In particular, a purge ejector coupled (e.g., directly mounted) in a boosted purge line may be diagnosed at the downstream location (proximate to the compressor inlet) based on changes in an exhaust air-fuel ratio incurred during purge through each path of a dual path purge system without requiring additional sensors, ducting, or other hardware. By improving purge system diagnostics at both the upstream and downstream end of the ejector, a boosted purge path may be accurately diagnosed, and exhaust emissions compliance of a boosted engine can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
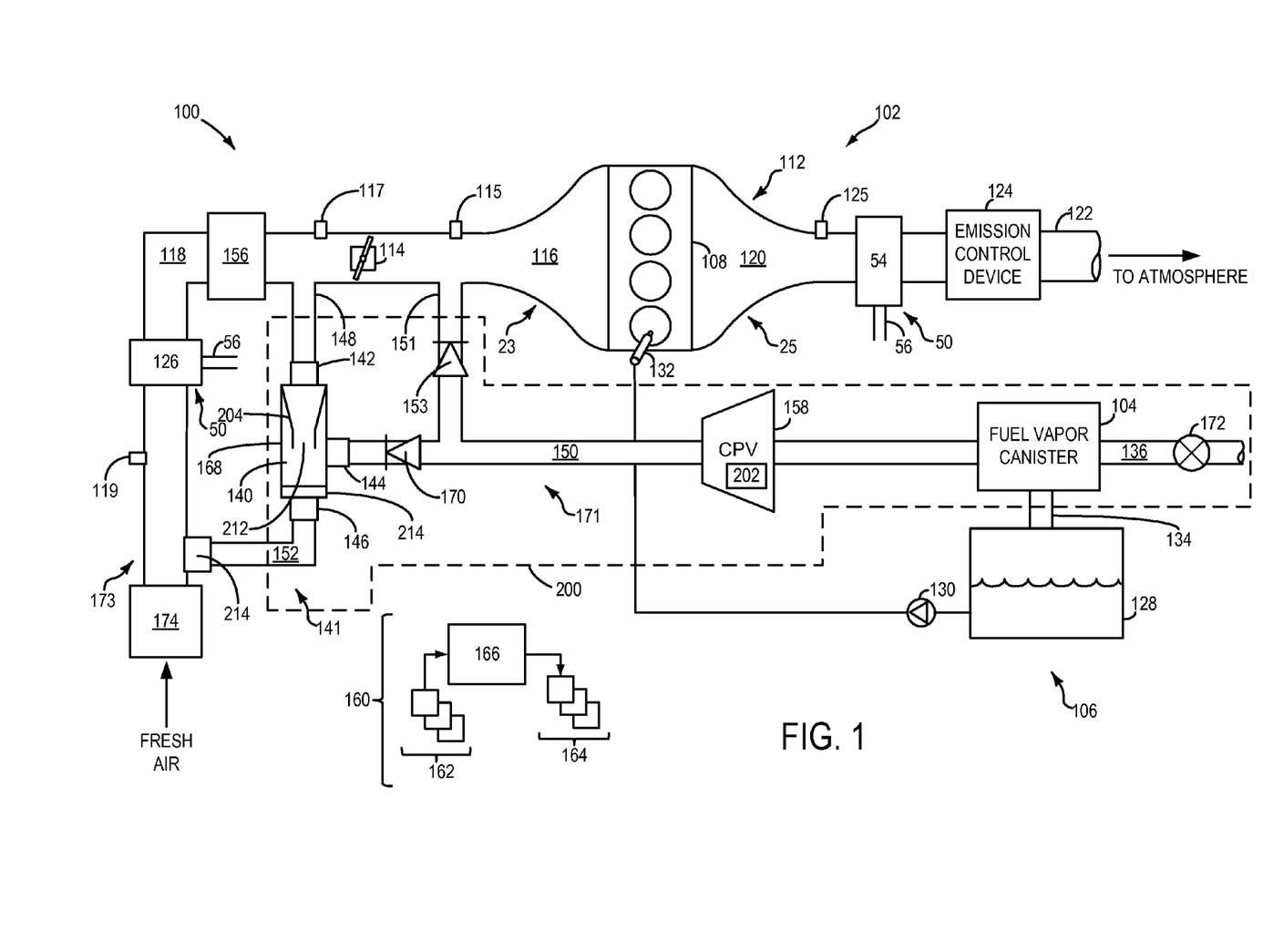
FIGS. 1 and 2 show schematic diagrams of example vehicle systems with dual path purge ejector systems.
Figure 2:
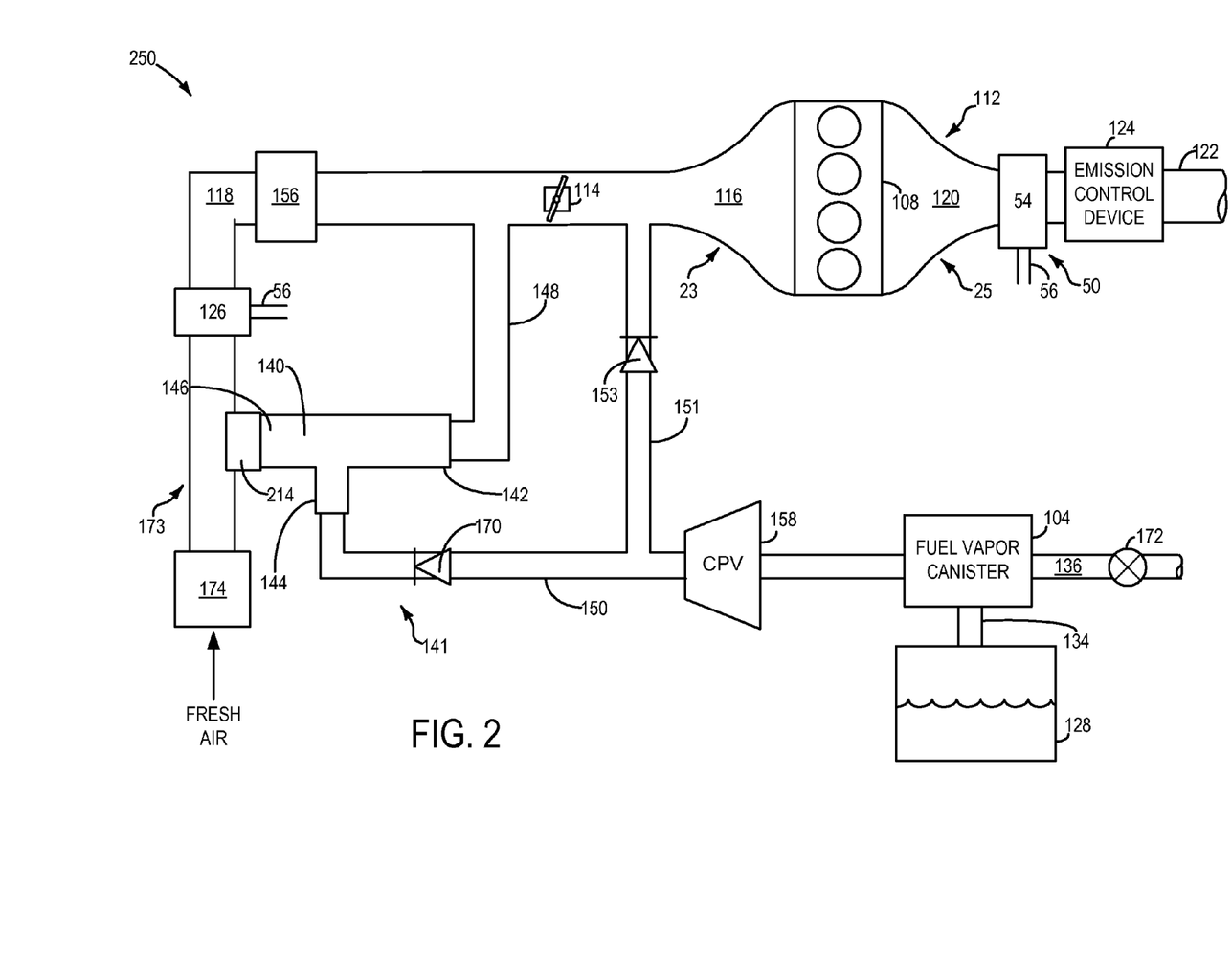

The present description is related to diagnosing leaks in a dual path purge system including an ejector in a vehicle, such as the example vehicle systems shown in FIGS. 1 and 2. An engine controller may be configured to perform a control routine, such as the example routine of FIGS. 3A and 3B, to diagnose leaks, e.g., leaks due to stresses to the ejector and/or degradation in ejector system components such as hoses or ducting, based on a comparison of the response of an exhaust gas sensor during vacuum purge of a fuel system canister relative to the sensor response during boosted purge of the canister. An example diagnostics is shown with reference to FIG. 4.

Turning to the figures, FIG. 1 shows a schematic depiction of a vehicle system 100. The vehicle system 100 includes an engine system 102 coupled to a fuel vapor recovery system 200 and a fuel system 106. The engine system 102 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine via a turbine bypass passage as controlled by wastegate (not shown). An amount of boost may additionally or optionally be controlled by controlling an amount of intake air directed through compressor 126. Controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system 200, described further below, via conduit 134, before being purged to the engine intake 23.

Fuel vapor recovery system 200 includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134.

While the depicted example shows a single canister, it will be appreciated that in alternate embodiments, a plurality of such canisters may be connected together. Canister 104 may communicate with the atmosphere through vent 136. In some examples, a canister vent valve 172 may be located along vent 136, coupled between the fuel vapor canister and the atmosphere, and may adjust a flow of air and vapors between canister 104 and the atmosphere. However, in other examples, a canister vent valve may not be included. In one example, operation of canister vent valve 172 may be regulated by a canister vent solenoid (not shown). For example, based on whether the canister is to be purged or not, the canister vent valve may be opened or closed. In some examples, an evaporative leak check module (ELCM) may be disposed in vent 136 and may be configured to control venting and/or assist in leak detection.

Conduit 134 may optionally include a fuel tank isolation valve (not shown). Among other functions, fuel tank isolation valve may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, an increased amount of vaporized HCs may be stored in fuel vapor canister 104. During a later engine operation, the stored vapors may be released back into the incoming air charge via fuel vapor purging system 200.

Fuel vapor recovery system 200 may include a dual path purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the duty cycle of an associated CPV solenoid 202. In one example, the duty cycle of the CPV solenoid may be determined by controller 166 responsive to engine operating conditions, including, for example, an air-fuel ratio. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

Conduit 150 is coupled to an ejector 140 in an ejector system 141 and includes a check valve 170 disposed therein between ejector 140 and CPV 158. Check valve 170 may prevent intake air from flowing through from the ejector into conduit 150, while allowing flow of fluid and fuel vapors from conduit 150 into ejector 140.

A conduit 151 couples conduit 150 to intake 23 at a position within conduit 150 between check valve 170 and CPV 158 and at a position in intake 23 downstream of throttle 114. For example, conduit 151 may be used to direct fuel from canister 104 to intake 23 using vacuum generated in intake manifold 116 during a purge event. Conduit 151 may include a check valve 153 disposed therein. Check valve 153 may prevent intake air from flowing through from intake manifold 116 into conduit 150, while allowing flow of fluid and fuel vapors from conduit 150 into intake manifold 116 via conduit 151 during a canister purging event.

Conduit 148 may be coupled to ejector 140 at a first port or inlet 142. Ejector 140 includes a second port 144 or inlet coupling ejector 140 to conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126 via a shut-off valve 214. Shut-off valve 214 is hard-mounted directly to air induction system 173 along conduit 118 at a position between air filter 174 and compressor 126. For example, shut-off valve 214 may be coupled to an existing AIS nipple or other orifice, e.g., an existing SAE male quick connect port, in AIS 173. Hard-mounting may include a direct mounting that is inflexible. For example, an inflexible hard mount could be accomplished through a multitude of methods including spin welding, laser bonding, or adhesive. Shut-off valve 214 is coupled to a third port 146 or outlet of ejector 140. Shut-off valve 214 is configured to close in response to leaks detected downstream of outlet 146 of ejector 140. As shown in FIG. 1, in some examples, a conduit or hose 152 may couple the third port 146 or outlet of ejector 140 to shut-off valve 214. In this example, if a disconnection of shut-off valve 214 with AIS 173 is detected, then shut-off valve 214 may close so air flow from the engine intake downstream of the compressor through the converging orifice in the ejector is discontinued. However, in other examples, as described below with regard to FIG. 2, shut-off valve may be integrated with ejector 140 and directly coupled thereto.

Ejector 140 includes a housing 168 coupled to ports 146, 144, and 142. In one example, only the three ports 146, 144, and 142 are included in ejector 140. Ejector 140 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. Thus, inlet port 142 may be referred to as a motive flow inlet of the ejector while outlet port 1446 may be referred to as a motive flow outlet of the ejector. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140. Thus, inlet port 144 may also be referred to as a suction flow inlet of the ejector.

Ejector 140 includes a nozzle 204 comprising an orifice which converges in a direction from inlet 142 toward suction inlet 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV 158 and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) and open or maintain open canister vent valve 172. For example, canister vent valve 172 may remain open except during vacuum tests performed on the system. At the same time, controller 12 may adjust the duty cycle of the CPV solenoid 202 and open CPV 158. Pressures within fuel vapor purging system 200 may then draw fresh air through vent 136, fuel vapor canister 104, and CPV 158 such that fuel vapors flow into conduit 150.

The operation of ejector 140 within fuel vapor purging system 200 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116. Further, at least a portion of the fuel vapors may flow from conduit 150 into ejector 140 via port 144. Upon entering the ejector via port 144, the fuel vapors may flow through nozzle 204 from toward port 142. Specifically, the intake manifold vacuum causes the fuel vapors to flow through orifice 212. Because the diameter of the area within the nozzle gradually increases in a direction from port 144 towards port 142, the fuel vapors flowing through the nozzle in this direction diffuse, which raises the pressure of the fuel vapors. After passing through the nozzle, the fuel vapors exit ejector 140 through first port 142 and flow through conduit 148 to intake passage 118 and then to intake manifold 116. The vacuum purge path thereby defines a first path of the dual path purge system.

Next, the operation of ejector 140 within fuel vapor purging system 200 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, for example. After the fluid flows into the ejector via the port 142, it flows through the converging orifice 212 in nozzle 204 in a direction from port 142 towards outlet 146. Because the diameter of the nozzle gradually decreases in a direction of this flow, a low pressure zone is created in a region of orifice 212 adjacent to suction inlet 144. The pressure in this low pressure zone may be lower than a pressure in duct 150. When present, this pressure differential provides a vacuum to conduit 150 to draw fuel vapor from canister 104. This pressure differential may further induce flow of fuel vapors from the fuel vapor canister, through the CPV, and into port 144 of ejector 140. Upon entering the ejector, the fuel vapors may be drawn along with the fluid from the intake manifold out of the ejector via outlet port 146 and into intake 118 at a position upstream of compressor 126. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114. The boost purge path thereby defines a second path of the dual path purge system.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. Exhaust gas sensor 125 may be, for example, a UEGO sensor, an EGO sensor, or a HEGO sensor. The other pressure and temperature sensors may include, for example, a pressure or airflow sensor 115 in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines. One example routine is shown herein with reference to FIGS. 3A and 3B. Instructions for carrying out method 300 of FIGS. 3A and 3B and the rest of the methods/routines included herein may be executed by the controller based on instructions stored on a memory of the controller and in conjunction with signals received from sensors of the vehicle system, such as the sensors described with reference to FIGS. 1 (above) and 2 (below). The controller may employ engine actuators of the engine system, such as the sensors described with reference to FIGS. 1 and 2, to adjust engine operation, according to the methods described herein.

FIG. 2 shows another example vehicle system embodiment 250 including an ejector system 141. In FIG. 2, like numbers correspond to like elements previously introduced in FIG. 1. FIG. 2 shows an example ejector system which includes a shut-off valve 214 integrated with ejector 140 so that shut-off valve 214 is directly coupled to motive outlet 146 of ejector 140. For example, shut-off valve 214 may form a portion of housing 168 of ejector 140 so that ejector 140 and shut-off valve 214 are formed together in a common component. As another example, shut-off valve 214 may be rigidly coupled to outlet 146 via welding or via a mechanical coupling. As described above with regard to FIG. 1, shut-off valve 214 coupling outlet 146 to AIS 173 is configured to discontinue at least a portion of fuel vapor purging operation if a degradation is detected at the shut-off valve.

In this example, the motive outlet 146 of ejector 140 is directly coupled via the shut-off valve to intake conduit 118 at a position upstream of compressor 126 between compressor 126 and air filter 172. In this way, a hose or conduit, such as conduit 152 shown in FIG. 1, may be eliminated from the ejector system.

As described above, leaks, e.g., leaks due to stresses to the ejector or venturi and/or degradation in ejector system components such as hoses or ducting, may need to be intermittently diagnosed. While leaks may be detected at port 142 (or in conduit 148 upstream of port 148) and at port 144 (or in conduit 150 upstream of port 144) using various sensors in the engine system, leaks or degradation of components of the ejector system 141 at positions at outlet 146 or downstream of outlet 146, e.g., within conduit 152 may go undetected. For example, if the ejector breaks, or if conduit or hose 152 decouples from outlet 146 or becomes degraded, then the system may not be able to recognize that a leak is occurring.

Thus, in order to identify ejector disconnection on the downstream side, where the ejector is coupled to the air induction system, the fuel system canister may be sequentially purged via intake vacuum and then via boost, and an exhaust air-fuel ratio may be monitored during both the purges. The ejector may be diagnosed after the fuel vapor purging system has been validated for no leaks and no engine diagnostic codes (such as misfire codes, intake manifold leak codes, lean engine operation codes, etc.), and after a refueling event where the canister has been sufficiently loaded. The diagnosing may be based on the response of exhaust gas sensor 125 during the vacuum purge as compared to during the boosted purge. As such, during both purging conditions, a rich response is expected at the exhaust gas sensor due to drawing of canister fuel vapors into the engine. If a rich response is observed during the vacuum purge but a rich response is not observed during the boosted purge, it may be determined that fuel vapors are not entering the intake manifold, suggesting that either there is a restriction inside the ejector, or the ejector has broken off. Further, based on fuel tank pressure changes incurred during the vacuum purge and boosted purge, a broken ejector may be distinguished from a clogged ejector, and appropriate mitigating steps may be taken.

As used herein, boosted purge refers to purging of the canister using vacuum generated at the ejector during boosted engine operation (and via boosted airflow). In comparison, vacuum purge refers to purging of the canister using vacuum generated at the engine intake during naturally aspirated engine operation.

In some embodiments, in order to reduce unwanted emissions, shut-off valve 214 coupling outlet 146 to AIS 173 may be configured to discontinue at least a portion of fuel vapor purging operation if ejector degradation is identified. Example mitigating actions performed in response to a detected disconnection of the ejector from the AIS include the boosted purge operation being terminated, shut-off valve 214 being closed, and/or an on-board diagnostics system being notified of a fault in the purging system so that maintenance can be performed.

Figure 3A:
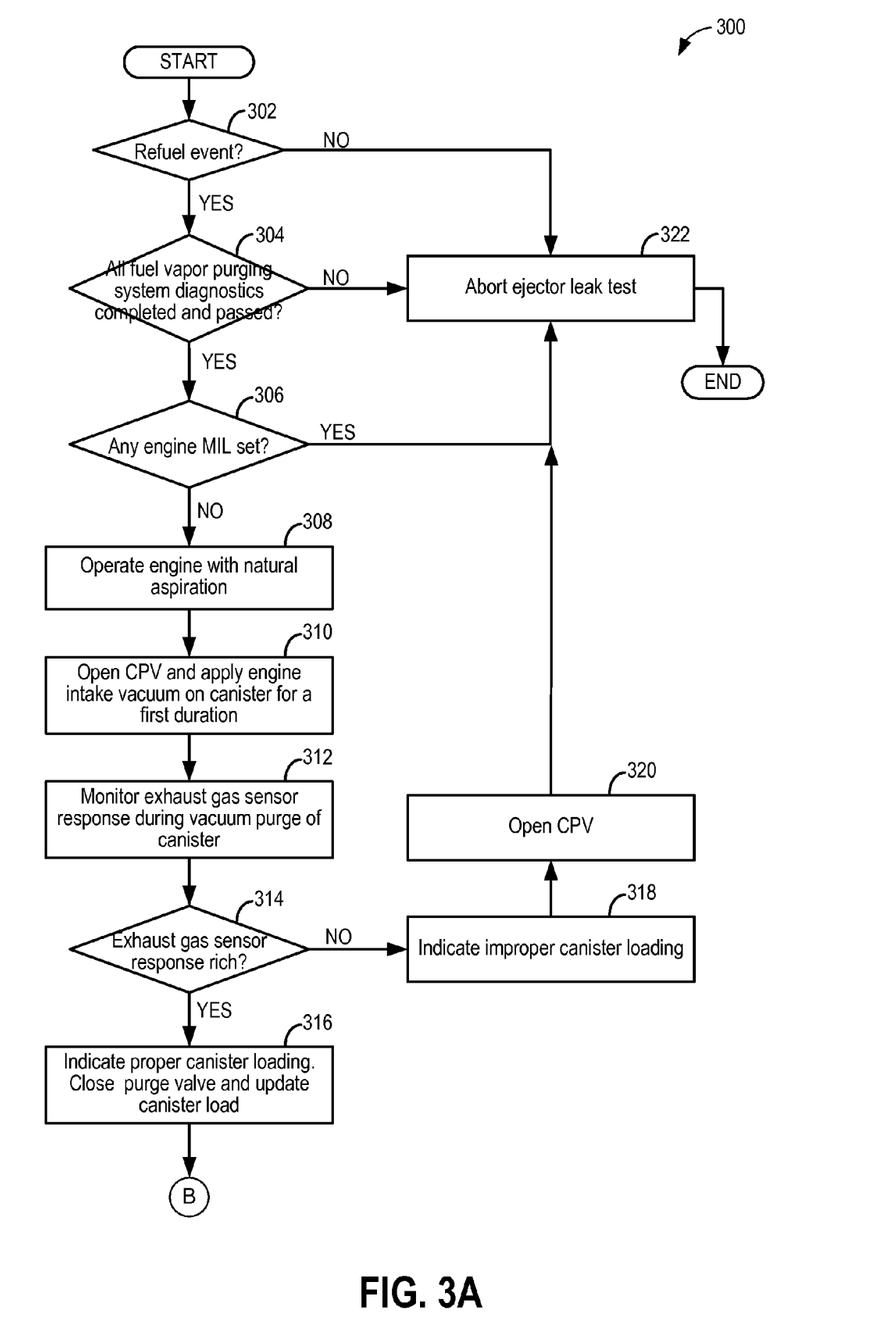
FIGS. 3A and 3B show an example method for diagnosing an ejector coupled to the dual path purge system, in accordance with the present disclosure.
Figure 3B:
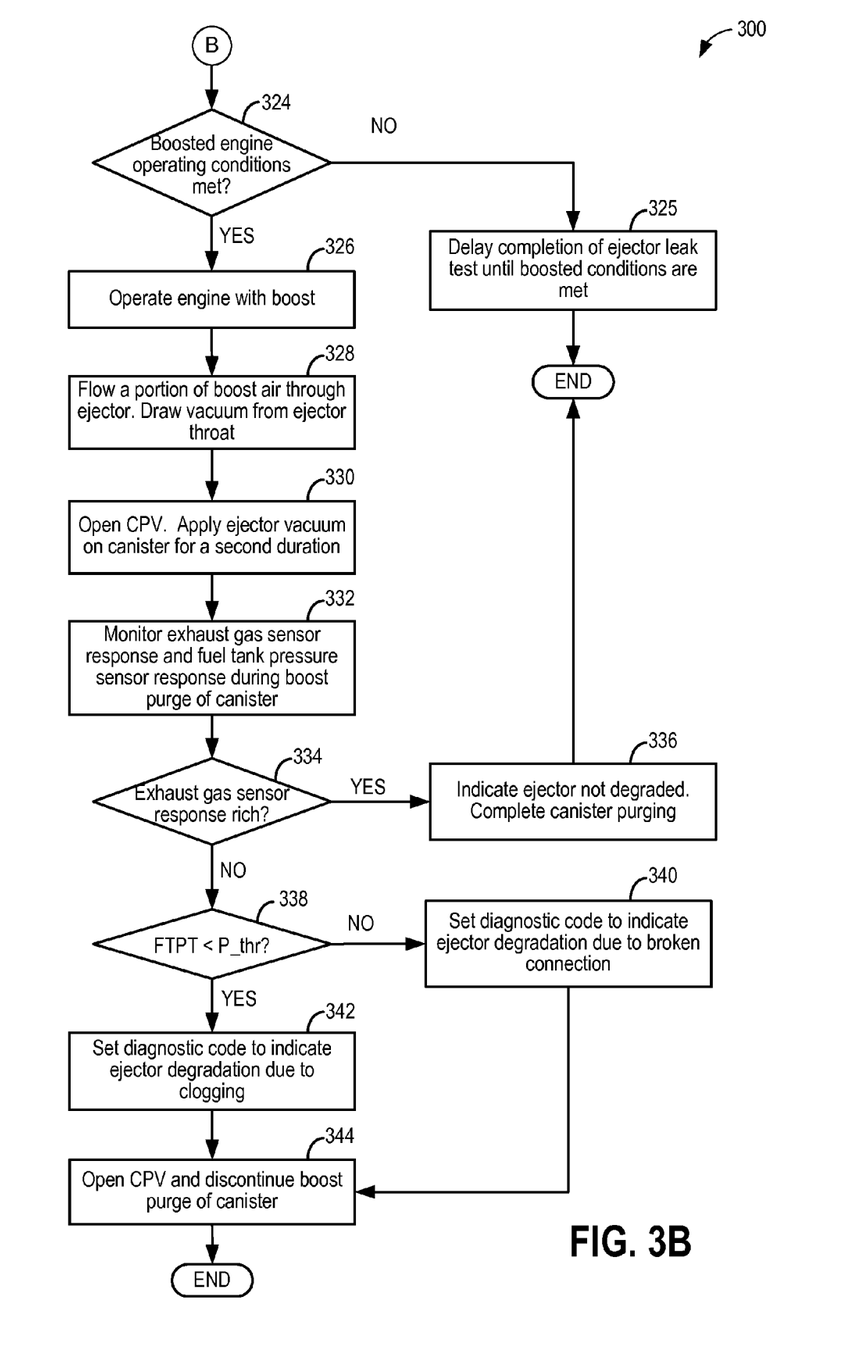

FIGS. 3A and 3B show an example method 300 for a dual path purge system, such a dual path purge system 171 shown in FIGS. 1 and 2. In method 300, an ejector system, such as ejector system 141, may be used during boosted engine operation to purge fuel vapor from a canister into the engine intake. Further, leaks and degradation may be diagnosed at locations in the ejector system downstream from the ejector outlet and mitigating actions may be performed in response to a detected leak.

At 302, method 300 includes determining if a refueling event has occurred. In one example, a refueling event may be confirmed if a fuel tank of the vehicle's fuel system has been refueled by more than a threshold amount (e.g., the tank is more than 40% full). The threshold amount may be based on a fuel vapor loading capacity of a fuel vapor canister of the fuel system, the threshold amount may be increased as the fuel vapor loading capacity of the fuel vapor canister increases. As such, the fuel vapor loading capacity may be a function of the size of the canister as well as the amount of hydrocarbons remaining in the canister from a last purge operation. Specifically, for ejector diagnostics to be initiated, the fuel tank may need to be refilled by a larger amount for a larger canister, and by a smaller amount for a smaller canister. Likewise, for a given canister, as the hydrocarbon load remaining in the canister from a last purge decrease, the fuel tank may be need to be refilled by a larger amount. In other words, at 302, it may be confirmed that the canister has been sufficiently loaded with fuel vapors during the refueling event. Thus, the refueling event is the stimulus or trigger for the ejector diagnostics. If the canister is not sufficiently loaded with fuel vapors (such as when the fuel tank is refilled by less than the threshold amount), the ejector leak test may be aborted at 322. Aborting the ejector leak test includes maintaining a canister purge valve closed, not applying vacuum (from the engine intake or the purge ejector) on the canister, and not purging the canister to the engine (using vacuum or boosted purge). The controller may also set a code to indicate that the test was not completed and that the ejector has not yet been diagnosed. In one example, canister purging may not be enabled until the ejector is diagnosed.

If a refuel event is confirmed, at 304, the method includes confirming that all fuel vapor purging system diagnostics have been completed and passed. In other words, the method diagnoses disconnection of the ejector after confirming that the no fuel system leaks are present. Confirming that all fuel vapor purging system diagnostics have been completed and passed includes confirming that the fuel vapor system has been validated for no leaks by performing functional and circuit checks on all components of the fuel vapor purging system, including the purge and vent lines, the check valves, purge valve, vent valve, and fuel tank isolation valve (if present). If any fuel system leak is present, as confirmed by the presence of a corresponding diagnostic code or malfunction indication light (MIL), the ejector leak test is aborted at 322.

If it has been confirmed that there are no fuel system leaks, then at 306, it may be confirmed that no other engine diagnostic codes have been set, or MILs have been illuminated. For example, it may be confirmed that there are no intake manifold leaks, no misfires have been detected, no oxygen sensor lean codes (e.g., lean codes P2196/P2198) have been set, etc. If any diagnostic codes or MILs are set, the ejector leak test is aborted at 322.

In this way, a sequence of intelligent diagnostics may be completed before a purge ejector is diagnosed. By verifying that there are no intake manifold leaks, fuel vapor purging system leaks, engine misfires, or lean operation diagnostic codes before initiating purge ejector diagnostics, the ensuring lack of an oxygen sensor rich response after a refueling event can be more reliably attributed to a faulty ejector. As such, there may be other failure modes that can make an oxygen sensor switch lean or rich, such as a leaky injector, the presence of vacuum leaks, etc. These other failure modes can interfere with the diagnostic performance of the above discussed routine and cause alpha/beta errors. Thus by ruling out the presence of those diagnostic codes, their interference with ejector diagnostics is reduced.

Upon confirming each of a refueling event (at 302), the absence of fuel system leaks (at 304), and the absence of other engine diagnostic codes (at 306), the method includes initiating the ejector leak test. Specifically, the method proceeds to 308 where the engine is operated with natural aspiration. That is, the engine is operated with an intake boosting device, such as the turbocharger of FIGS. 1 and 2, disabled.

At 310, the method includes, while operating the engine with natural aspiration, purging the fuel vapor canister to the engine intake under vacuum. Specifically, an engine controller may open a canister purge valve (CPV), by energizing or de-energizing the purge valve solenoid, and apply engine intake manifold vacuum to the fuel vapor canister. In addition to opening the purge valve, a canister vent valve (CVV) may also be opened. Fresh air may then be drawn in to the canister via the vent valve. The drawn fresh air dislodges fuel vapors trapped in the canister, which are then drawn into the engine intake manifold and combusted in the engine cylinders during engine operation. During this vacuum purge, the canister is purged to the engine intake at a location downstream of the intake throttle, while bypassing the purge path ejector. Engine intake vacuum is applied on the canister for a first duration to reduce the canister load to a first (non-zero) threshold. Specifically, the canister is not completely purged during the vacuum purge. As such, the CVV is a normally open valve and is only closed for diagnostics. The first duration of CPV and CVV opening is used to establish a baseline offset for the oxygen sensors using the vacuum path which is uncompromised based on the initial entry conditions.

It will be appreciated that while the example above suggests active initiating vacuum purging of the canister in response to refuel event, in alternate examples, it may be first confirmed that a purge request has occurred. For example, a fuel vapor vacuum purge may be initiated in response to an amount of fuel vapor stored in the fuel vapor canister being greater than a threshold amount, or after an emission control device light-off temperature has been attained.

At 312, the method includes monitoring the response of an exhaust gas sensor during the vacuum purge of the canister. That is, fluctuations in the exhaust air-fuel ratio are monitored while the canister is purged under vacuum. The exhaust gas sensor may be coupled to the exhaust manifold of the engine, upstream of a turbocharger turbine. In one example, the exhaust gas sensor is an exhaust oxygen sensor, such as a UEGO, HEGO, or EGO sensor. As such, due to the purging of fuel vapors into the engine intake, a richer than stoichiometry exhaust air-fuel ratio may be expected at the exhaust gas sensor during the purging.

At 314, it may be determined if a rich response is present at the exhaust gas sensor during the vacuum purge. In one example, a rich response is confirmed if the exhaust gas sensor output corresponds to an exhaust air-fuel ratio that is lower than a threshold (that is, more fuel than air), such as lower than stoichiometry (14.9). If a rich response is not confirmed, for example, if the exhaust air-fuel ratio is at or above the threshold (e.g., at stoichiometry, or leaner than stoichiometry), then at 318, it may be determined that the canister has been improperly loaded. For example, it may be indicated that the canister has not been loaded during the preceding refuel event. In response to the lack of a rich response at the exhaust gas sensor during the vacuum purge, at 320, the canister purge valve may be commanded open, and the leak test may be aborted at 322.

If, on the other hand, a rich response is confirmed at the exhaust gas sensor during the vacuum purge, then at 316, the method includes indicating proper canister loading during the refuel event. Also, the purge valve may be closed when the first duration has elapsed and the canister load may be updated in the controller's memory. As an example, a timer may be started when the canister purge valve is opened, and the canister purge valve may be closed when the first duration has elapsed on the timer. Based on the first duration, the canister load at the onset of the diagnostic routine (or the canister load at the end of the refueling event), as well as the canister purge rate (as determined by the duty cycle of the purge valve), a hydrocarbon load remaining in the canister at the end of the vacuum purge may be calculated and stored to the controller's memory.

Upon generating a rich response at the exhaust air-fuel ratio sensor by opening the purge valve and applying engine vacuum to the fuel vapor canister, the method moves to 324 wherein it is determined whether boosted engine operating conditions are met. In one example, boosted operating conditions may be considered met in response to a higher than threshold operator torque demand, or an operator pedal tip-in event. If boosted operating conditions are not confirmed, at 325, the method includes delaying completion of the ejector leak test until boosted conditions are met. As elaborated herein, an ejector leak or disconnection can be diagnosed by comparing an exhaust gas sensor response during a vacuum purge of the fuel vapor canister to the sensor's response during a boosted purge of the canister.

If boosted operating conditions are confirmed, at 326, the method includes operating the engine with boost by enabling the charging device, such as by enabling the turbocharger of FIGS. 1-2. At 328, the method includes flowing a portion of boosted air from downstream of the compressor through a purge ejector, and then back to the compressor inlet. The purge ejector may be directly mounted to an intake passage of the engine's air induction system, upstream of the compressor inlet. As such, the flow of boosted air from the ejector inlet, and then through the ejector outlet to the compressor inlet, results in a pressure drop at the throat of the ejector, and the consequent generation of vacuum that can be drawn from the ejector throat.

At 330, the method includes, with the turbocharger enabled, opening the canister purge valve and applying ejector vacuum to the canister to purge the canister under boost. In one example, the boosted purge of the canister may be triggered in response to boosted engine operating conditions being met. In an alternate example, the boosted purge of the canister may be initiated upon confirming boosted purge conditions being met. In either case, during the ejector leak test, the vacuum purge precedes the boosted purge over a given vehicle drive cycle. Specifically, an engine controller may open the canister purge valve (CPV), by energizing or de-energizing the purge valve solenoid, and apply vacuum drawn from the throat of the ejector to the fuel vapor canister. In addition to opening the purge valve, a canister vent valve (CVV) may also be opened. Fresh air may then be drawn in to the canister via the vent valve. The drawn fresh air dislodges fuel vapors trapped in the canister, which are then drawn into the ejector via the suction inlet port of the ejector, and from there are delivered, via the ejector motive flow outlet, to the intake passage at the compressor inlet. The fuel vapors may then flow through the compressor into the engine intake manifold where they are combusted in the engine cylinders. During this boosted purge, the canister is purged to the engine intake at a location upstream of the compress, while passing through the purge path ejector. Ejector vacuum is applied on the canister to reduce the canister load, such as from the first threshold load (attained at the end of the vacuum purge) to a second threshold load lower than the first threshold load. In one example, the canister may be completely cleaned at the end of the boosted purge.

At 332, as at 312, the method includes monitoring the response of the exhaust gas sensor during the boosted purge of the canister. That is, fluctuations in the exhaust air-fuel ratio are monitored while the canister is purged with ejector vacuum, the ejector vacuum generated under boosted operating conditions. As such, due to the purging of fuel vapors into the compressor inlet, a richer than stoichiometry exhaust air-fuel ratio may be expected at the exhaust gas sensor during the purging. The controller may then diagnose the purge ejector, by indicating disconnection of the ejector coupled in the boosted purge path between the fuel vapor canister and the compressor inlet based on the exhaust air-fuel ratio (or exhaust gas sensor response) during the boosted purge relative to the exhaust air-fuel ratio (or exhaust gas sensor response) during the vacuum purge.

At 334, the method includes determining if a rich response is present at the exhaust gas sensor during the boosted purge. As one example, a rich response is confirmed if the exhaust gas sensor output corresponds to an exhaust air-fuel ratio that is lower than a threshold (that is, more fuel than air). In one example, the threshold includes a stoichiometric exhaust air-fuel ratio (that is, 14.9).

In response to the exhaust air-fuel ratio being lower than the threshold during each of the vacuum purge and the boosted purge of the canister (that is, in response to a rich air-fuel ratio response being observed during both vacuum and boosted purges), at 336, it may be determined that hydrocarbons from the fuel vapor canister are entering the intake manifold, and that the ejector is not disconnected. In response to an indication of no disconnection (or clogging) of the ejector, the method includes completing the boosted canister purge while maintaining each of the purge valve and the shut-off valve open.

In response to the exhaust air-fuel ratio being lower than the threshold during the preceding vacuum purge and being higher than the threshold during the subsequent boosted purge of the canister, it may be determined that hydrocarbons from the fuel vapor canister are not entering the intake manifold. As such, this may be due to a restriction inside the ejector (e.g., due to the ejector being clogged) or due to the ejector being broken or decoupled/disconnected from the intake passage of the AIS, upstream of the compressor inlet. The controller may then proceed to differentiate between the ejector being broken (or decoupled) and the ejector being clogged based on the fuel tank pressure response during the boosted purge. In particular, at 338, the method includes monitoring the fuel tank pressure during the boosted purge (based on the output of a fuel tank pressure sensor or pressure transducer coupled to the fuel tank), and comparing the fuel tank pressure to a threshold pressure (P_thr). The threshold pressure corresponds to a flow through the evaporative system that can induce a vacuum in the fuel tank'. If the estimated fuel tank pressure is higher than the threshold pressure during the boosted purge, then at 340, the controller may indicate that the ejector is clogged and set a corresponding diagnostic code. Else, if the estimated fuel tank pressure remains lower higher than the threshold pressure during the boosted purge, then at 342, it may be determined that the ejector is broken or disconnected from the AIS.

From each of 340 and 342, in response to ejector degradation due to clogging or decoupling, the method moves to 344 wherein the canister purge valve is commanded closed, and further boosted purging of the canister is discontinued. In some embodiments, in addition to discontinuing boosted canister purge by closing the canister purge valve, in response to the indication of ejector degradation, the controller may also close a shut-off valve coupled to a motive outlet of the ejector. By closing the shut-off valve, release of hydrocarbons to the atmosphere is reduced, improving exhaust emissions compliance even with a degraded ejector. In this way, the engine controller may disable purge under boosted conditions or use an additional shut-off valve to prevent fuel vapors from escaping in response to the indication of degradation.

Upon completion of the test, the controller may also set a code to indicate that the test was attempted and completed and that the ejector has been diagnosed. The ejector test may be performed once every drive cycle, and canister purging may be enabled during the drive cycle after the test is performed and the ejector diagnosed with no leaks. In alternate examples, the ejector test may be performed once every threshold number of engine cycles, engine starts, threshold miles of vehicle travel, threshold duration of vehicle operation, etc.

In this way, degradation of a purge path ejector due to disconnection from an AIS can be indicated based on the presence of a rich response at an exhaust gas sensor during a vacuum purge of a fuel vapor canister followed by the absence of a rich response at the exhaust gas sensor during a subsequent boosted purge of the fuel vapor canister.

Figure 4:
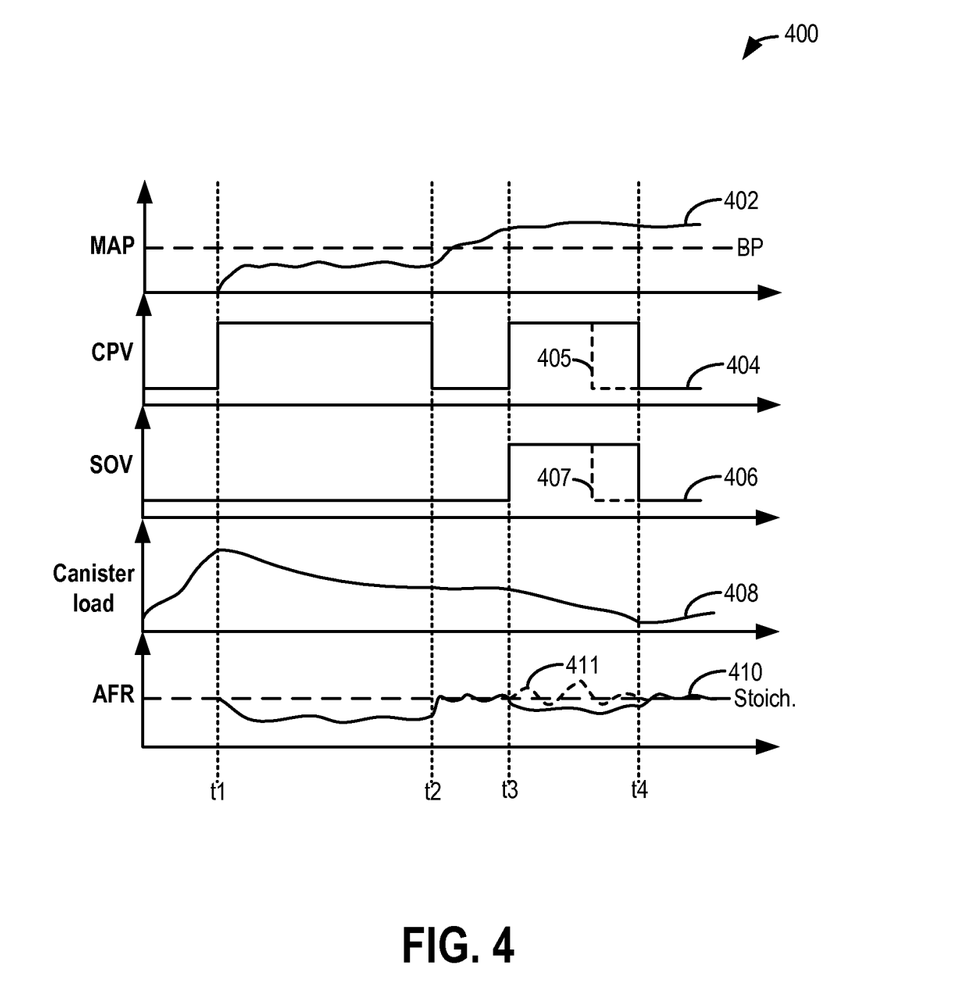
FIG. 4 shows an example diagnosis of an ejector coupled in a dual path purge system.

Now turning to FIG. 4, an example ejector diagnostic operation is shown. Map 400 depicts manifold pressure (MAP) relative to BP at plot 402, the position of a canister purge valve (CPV) at plot 404, the position of an ejector shut-off valve at plot 406, canister load at plot 408, and exhaust air-fuel ratio (AFR) estimated by an exhaust gas oxygen sensor, relative to stoichiometry, at plot 410. All plots are depicted over time (along the x-axis).

Between t0 and t1, a fuel tank refueling event may occur. During this time, the engine is not operated, and the purge valve and shut-off valve are in their default closed positions. Due to the generation of refueling fuel vapors, which are absorbed into and stored in the fuel system canister, the canister load increases. While not depicted, during an engine operation immediately preceding the refueling event, over the same drive cycle, all fuel vapor purging system diagnostics may have been completed and no leaks may have been determined. In addition, no diagnostic codes may be set in the engine at t1. Accordingly, at t1, in response to the refueling event, the ejector diagnostics are triggered.

At t1, the engine is operated with natural aspiration (wherein MAP is less than BP), and the CPV is opened so that engine intake vacuum can be applied on the fuel vapor canister. The SOV is maintained closed. As a result of the application of vacuum, fuel vapors are drawn from the canister into the engine intake, downstream of an intake throttle, with a corresponding gradual drop in canister load. In the present example, intake vacuum is applied for a duration from t1 to t2 during which time the canister load is reduced, but not emptied. A rich response is generated at the exhaust sensor during the vacuum purge of the canister due to the ingestion of fuel vapors at the engine (air-fuel ratio richer than stoichiometry depicted at plot 410 by an air-fuel ratio value below stoichiometry due to more air than fuel).

At t2, vacuum purging of the canister is terminated and the canister load is updated to the controller's memory. Also at t2, boosted engine operating conditions are confirmed, responsive to which a turbocharger is enabled and the engine is operated with boost (wherein MAP is above BP). At t3, in boosted purge conditions may be considered met responsive to which boosted purge of the canister is initiated. The boosted purge includes purging of the canister using vacuum generated at the ejector during boosted engine operation. Therein, the SOV is opened to allow boost air to travel from the compressor into the ejector motive flow inlet, through the ejector throat, and then into the compressor inlet via the ejector motive flow outlet. During passage through the ejector throat, the pressure drop results in a vacuum being drawn at the ejector throat. By concurrently opening the CPV, the ejector vacuum is applied on the canister, drawing canister fuel vapors into the compressor inlet, via the ejector and the open SOV.

The exhaust gas sensor response is monitored during the boosted canister purge between t3 and t4. In the present example, in response to a rich exhaust air-fuel ratio response at the exhaust sensor during the boosted purge of the canister, ingestion of fuel vapors at the engine (via the ejector and the compressor inlet) is confirmed. Also in the present example, fuel tank pressure (not shown) remains above a threshold during the boosted purge. Accordingly, it is determined that the ejector is not disconnected from the AIS. At t4, upon completion of the diagnostic routine, each of the CPV and the SOV are closed to discontinue the purging.

In comparison, if a lean or stoichiometric exhaust air-fuel ratio response were observed at the exhaust sensor during the boosted purge of the canister, as indicated at dashed segment 411, while fuel tank pressure (not shown) remained above a threshold, ingestion of fuel vapors at the engine (via the ejector and the compressor inlet) would not be confirmed. Accordingly, it would be determined that the ejector is disconnected from the AIS, and a diagnostic code may be set. In one example, in response to the indication of ejector disconnection, each of the CPV and the SOV may be immediately closed to discontinue the purging, for example, before t4, as indicated by dashed segments 405 and 407.

In this way, in response to a fuel tank refill, with a turbocharger disabled, a controller may generate a rich response at an exhaust air-fuel ratio sensor by opening a purge valve and applying engine vacuum to a fuel vapor canister. Then, with the turbocharger enabled, the controller may close the purge valve, flow boosted air through an ejector, and apply ejector vacuum to the canister. The controller may then indicate ejector degradation responsive to lack of a rich response at the sensor. In the above embodiment, in response to an indication of ejector degradation, the method may include disabling boosted purge of the canister and enabling only vacuum purge of the canister. In each of the above method embodiments, the fuel tank refill includes the fuel tank being refilled by more than a threshold amount, the threshold amount based on a fuel vapor loading capacity of the canister. Also, in any of the above method embodiments, applying engine vacuum includes applying engine intake manifold vacuum to the canister for a first duration to reduce the canister load to a first threshold load, and applying ejector vacuum to the canister includes drawing vacuum from a throat of the ejector to reduce the canister load from the first threshold load to a second threshold load, lower than the first threshold load.

In another example embodiment, an engine system comprises an engine including an intake and an exhaust; an exhaust air-fuel ratio sensor; a fuel system including a fuel tank coupled to a fuel vapor canister; a turbocharger including an intake compressor and an exhaust turbine; an ejector including a motive outlet hard-mounted to the engine intake, upstream of a compressor inlet; and a controller configured with computer-readable instructions stored on non-transitory memory for: following fuel tank refilling, while operating the engine with the turbocharger disabled, flowing fuel vapors from the canister to the engine intake bypassing the ejector and estimating a first exhaust air-fuel ratio; then, while operating the engine with the turbocharger enabled, flowing flow fuel vapors from the canister to the compressor inlet through the ejector and estimating a second exhaust air-fuel ratio; and indicating degradation of the ejector based on each of the first and second exhaust air-fuel ratio relative to a threshold. In such an example, the fuel system includes a canister purge valve coupled between the canister and the engine intake, and flowing fuel vapors from the canister to the engine intake includes opening the canister purge valve and applying engine intake vacuum on the canister, and flowing fuel vapors from the canister to the compressor inlet includes closing the canister purge valve while flowing compressed air from downstream of the compressor to the compressor inlet via the ejector and applying ejector vacuum on the canister. In any of the preceding engine system embodiments, ejector degradation is indicated in response to the first exhaust air-fuel ratio being lower than the threshold while the second exhaust air-fuel ratio is higher than the threshold, and no ejector degradation is indicated in response to each of the first and second exhaust air-fuel ratio being lower than the threshold. Indicator ejector degradation may further include setting a diagnostic code to indicate that the ejector is decoupled from the engine intake, upstream of the compressor inlet. In any of the preceding engine system embodiments, the exhaust air-fuel ratio sensor may be an exhaust oxygen sensor coupled to the engine exhaust, upstream of the exhaust turbine, such as a UEGO, HEGO, or EGO sensor.

In a further representation, a method for diagnosing a purge path ejector includes, during selected conditions over a drive cycle, purging a fuel vapor canister under vacuum for a first duration; then purging the fuel vapor canister under boost for a second duration; and indicating degradation of a purge path ejector based on response of an exhaust gas sensor during the purging under vacuum compared to sensor response during the purging under boost. The selected conditions may include each of engine operation following a refueling event wherein more than a threshold amount of fuel has been refilled into a fuel tank, while no fuel system leaks are confirmed, and while no engine misfire or lean operation diagnostic are set. The first duration may be less than a duration required to completely purge the canister. The indicating may include indicating degradation in response to presence of a rich response of the exhaust gas sensor during the purging under vacuum and absence of the rich response of the exhaust gas sensor during the purging under boost. The method may further comprise, in response to absence of the rich response of the exhaust gas sensor during the purging under vacuum, indicating that the canister is not loaded and restoring fuel system valves to a default position.

In this way, a high pressure purge line of a multi-path fuel vapor purge system can be diagnosed. Specifically, disconnection or breakage of an ejector coupled in a boosted purge path can be diagnosed without relying on additional sensors or hardware. By identifying ejector degradation based on the presence of a rich response during a vacuum purge of the canister and the absence of the rich response during a subsequent boost purge of the canister, the release of fuel vapor hydrocarbons to the atmosphere can be detected in a timely manner, and addressed accordingly. As such, the approach allows a boosted purge path to be diagnosed at both the upstream and downstream end of the ejector, improving engine emissions compliance.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for a boosted engine, comprising:
indicating degradation of an ejector coupled in a boosted purge path between a fuel vapor canister and a compressor inlet based on exhaust air-fuel ratio during boosted purge relative to exhaust air-fuel ratio during vacuum purge of the canister.

2. The method of claim 1, further comprising, in response to an indication of degradation, discontinuing boosted canister purge and closing each of a shut-off valve coupled to an outlet of the ejector and a canister purge valve, and in response to an indication of no degradation, completing boosted canister purge while maintaining each of the shut-off valve and the canister purge valve open.

3. The method of claim 1, further comprising, diagnosing the degradation after refueling a fuel tank of the engine to more than a threshold amount.

4. The method of claim 1, wherein the fuel vapor canister is coupled to a fuel system including a fuel tank, the method further comprising, diagnosing the degradation after confirming that no fuel system leaks are present.

5. The method of claim 1, wherein the vacuum purge precedes the boosted purge over a given vehicle drive cycle.

6. The method of claim 5, wherein the canister is not completely purged during the vacuum purge preceding the boosted purge.

7. The method of claim 1, wherein the indicating including indicating degradation of the ejector in response to the exhaust air fuel ratio being lower than a threshold during vacuum purge and being higher than the threshold during the subsequent boosted purge, the threshold including a stoichiometric exhaust air-fuel ratio.

8. The method of claim 1, wherein during the boosted purge, the engine is operated under boost and the fuel vapor canister is purged to the compressor inlet via the ejector; and wherein during the vacuum purge, the engine is operated with natural aspiration, and the canister is purged to an engine intake while bypassing the ejector.

9. The method of claim 1, wherein the ejector is directly mounted to an intake passage of the engine, upstream of the compressor inlet.

10. The method of claim 1, wherein the indicating includes setting a diagnostic code to indicate that the ejector is decoupled from an air intake passage, upstream of the compressor inlet, or clogged.

11. The method of claim 10, further comprising, differentiating between the ejector being decoupled and the ejector being clogged based on fuel tank pressure response during the boosted purge.

12. A method, comprising:
in response to a fuel tank refill,
with a turbocharger disabled, generating a rich response at an exhaust air-fuel ratio sensor by opening a purge valve and applying engine vacuum to a fuel vapor canister;
then, with the turbocharger enabled, closing the purge valve, flowing boosted air through an ejector, and applying ejector vacuum to the canister; and
indicating ejector degradation responsive to lack of a rich response at the sensor.

13. The method of claim 12, further comprising, in response to an indication of ejector degradation, disabling boosted purge of the canister and enabling only vacuum purge of the canister.

14. The method of claim 12, wherein the fuel tank refill includes the fuel tank being refilled by more than a threshold amount, the threshold amount based on a fuel vapor loading capacity of the canister.

15. The method of claim 12, wherein applying engine vacuum includes applying engine intake manifold vacuum to the canister for a first duration to reduce the canister load to a first threshold load, and wherein applying ejector vacuum to the canister includes drawing vacuum from a throat of the ejector to reduce the canister load from the first threshold load to a second threshold load, lower than the first threshold load.

16. An engine system, comprising:
an engine including an intake and an exhaust;
an exhaust air-fuel ratio sensor;
a fuel system including a fuel tank coupled to a fuel vapor canister;
a turbocharger including an intake compressor and an exhaust turbine;
an ejector including a motive outlet hard-mounted to the engine intake, upstream of a compressor inlet; and
a controller configured with computer-readable instructions stored on non-transitory memory for:
following fuel tank refilling,
while operating the engine with the turbocharger disabled, flowing fuel vapors from the canister to the engine intake bypassing the ejector and estimating a first exhaust air-fuel ratio;
then, while operating the engine with the turbocharger enabled, flowing flow fuel vapors from the canister to the compressor inlet through the ejector and estimating a second exhaust air-fuel ratio; and
indicating degradation of the ejector based on each of the first and second exhaust air-fuel ratio relative to a threshold.

17. The system of claim 16, wherein the fuel system includes a canister purge valve coupled between the canister and the engine intake, and wherein flowing fuel vapors from the canister to the engine intake includes opening the canister purge valve and applying engine intake vacuum on the canister, and wherein flowing fuel vapors from the canister to the compressor inlet includes closing the canister purge valve while flowing compressed air from downstream of the compressor to the compressor inlet via the ejector and applying ejector vacuum on the canister.

18. The system of claim 16, wherein the indicating includes, indicating ejector degradation in response to the first exhaust air-fuel ratio being lower than the threshold while the second exhaust air-fuel ratio is higher than the threshold, and indicating no ejector degradation in response to each of the first and second exhaust air-fuel ratio being lower than the threshold.

19. The system of claim 18, wherein indicating ejector degradation further includes setting a diagnostic code to indicate that the ejector is decoupled from the engine intake, upstream of the compressor inlet.

20. The system of claim 16, wherein the exhaust air-fuel ratio sensor is an exhaust oxygen sensor coupled to the engine exhaust, upstream of the exhaust turbine.

* * * * *